(12) United States Patent
Doherty et al.

(10) Patent No.: US 9,495,193 B2
(45) Date of Patent: Nov. 15, 2016

(54) MONITORING HYPERVISOR AND PROVISIONED INSTANCES OF HOSTED VIRTUAL MACHINES USING MONITORING TEMPLATES

(71) Applicant: International Business Machines Corporation, Armonk, NY (US)

(72) Inventors: Liam M. Doherty, Subiaco (AU); King-Yan Kwan, Perth (AU); Mark A. Shewell, Perth (AU); Peter G. Woodward, Perth (AU)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/561,661

(22) Filed: Dec. 5, 2014

(65) Prior Publication Data
US 2016/0162312 A1 Jun. 9, 2016

(51) Int. Cl.
G06F 9/455 (2006.01)
G06F 11/30 (2006.01)

(52) U.S. Cl.
CPC .......... *G06F 9/45558* (2013.01); *G06F 11/30* (2013.01); *G06F 2009/4557* (2013.01); *G06F 2009/45562* (2013.01); *G06F 2009/45591* (2013.01)

(58) Field of Classification Search
None
See application file for complete search history.

(56) References Cited

U.S. PATENT DOCUMENTS

| 8,447,851 | B1 | 5/2013 | Anderson et al. | |
|---|---|---|---|---|
| 8,554,829 | B2 | 10/2013 | Tamura | |
| 8,595,723 | B2* | 11/2013 | Garrett | G06F 9/44505 713/100 |
| 2008/0222632 | A1* | 9/2008 | Ueno | G06F 11/3423 718/1 |
| 2010/0318990 | A1* | 12/2010 | Hou | G06F 9/45533 718/1 |
| 2011/0126207 | A1* | 5/2011 | Wipfel | H04L 9/3213 718/104 |
| 2011/0258621 | A1* | 10/2011 | Kern | G06F 9/5072 718/1 |
| 2011/0276951 | A1* | 11/2011 | Jain | G06F 11/3006 717/140 |
| 2012/0159454 | A1* | 6/2012 | Barham | G06F 9/45558 717/128 |
| 2012/0297059 | A1 | 11/2012 | Bross | |

(Continued)

FOREIGN PATENT DOCUMENTS

WO 2013037619 A1 3/2013

OTHER PUBLICATIONS

List of IBM Patents or Patent Applications Treated as Related, Appendix P, Filed Herewith.
Liam M. Doherty, et al., "Configuring Monitoring for Virtualized Servers", U.S. Appl. No. 14/837,204, filed Aug. 27, 2015, (a copy is not provided as this application is available to the Examiner).
"A Method and Apparatus for Automated Placement & Configuration of System Monitors in Cloud Environments", An IP.com Prior Art Database Technical Disclosure, IP.com No. IPCOM000222358D, Publication: Sep. 26, 2012.
"Cloud Based Remove Server Monitor", Copyright 2008-2014 LogicMonitor, Inc.

*Primary Examiner* — Benjamin Wu
(74) *Attorney, Agent, or Firm* — Daniel R. Simek

(57) ABSTRACT

A method for configuring and maintaining external monitoring of one or more instances of a virtual machine within a virtualized computing environment. The method includes a computer processor monitoring a hypervisor. The method further includes a computer processor identifying a first list, wherein the first list is comprised of one or more monitoring templates respectively associated with one or more virtual machine types, and maintaining a second list comprised plurality of provisioned instances of virtual machines, wherein the second list also includes a first information respectively associated with the plurality of provisioned instances of virtual machines. The method further includes a computer processor compiling a third list and transmitting the third list to the monitoring system. The method further includes a computer processor receiving the third list and in response, a computer processor executing one or more monitoring functions based, at least in part, on the third list.

12 Claims, 5 Drawing Sheets

(56) References Cited

U.S. PATENT DOCUMENTS

| | | | |
|---|---|---|---|
| 2012/0324445 A1* | 12/2012 | Dow | G06F 9/45504 718/1 |
| 2013/0054948 A1* | 2/2013 | Raj | G06F 9/45558 713/2 |
| 2013/0139153 A1* | 5/2013 | Shah | G06F 9/45558 718/1 |
| 2013/0238785 A1* | 9/2013 | Hawk | G06F 9/5072 709/224 |
| 2014/0047440 A1* | 2/2014 | Da Silva | G06F 9/5077 718/1 |
| 2014/0053272 A1* | 2/2014 | Lukacs | G06F 21/53 726/24 |
| 2014/0067917 A1* | 3/2014 | Kim | G06F 9/45533 709/203 |
| 2014/0075013 A1 | 3/2014 | Agrawal et al. | |
| 2014/0130041 A1* | 5/2014 | Luxenberg | G06F 9/4445 718/1 |
| 2016/0085578 A1* | 3/2016 | Bhide | G06F 9/45558 718/1 |
| 2016/0098287 A1* | 4/2016 | Prasad | G06F 9/45558 718/1 |

\* cited by examiner

MONITORING HYPERVISOR AND PROVISIONED INSTANCES OF HOSTED VIRTUAL MACHINES USING MONITORING TEMPLATES

FIELD OF THE INVENTION

The present invention relates generally to the field of virtual machine management, and more particularly to configuring and monitoring various types of virtual servers.

BACKGROUND OF THE INVENTION

The size and complexity of computing networks and data centers has rapidly grown, and the number of servers and other devices within these data centers has expanded greatly. Customer requirements changed introducing multiple operating systems, optimized hardware configurations, more rapid application development cycles, and unpredictable demand for computing resources. The cost, size, energy consumption, and complexity of data centers built around individual servers, personal computers (PCs), storage devices, etc. became prohibitive to maintain. Data centers have evolved away from individual servers and PCs to rack mounted "blade" server "farms" and RISC (reduced instruction set computing) systems (computing clusters) and most recently "cloud" computing powered by mainframe computers that can be "virtualized" into entities and systems tailored to a customer's requirements.

In system virtualization, multiple virtual entities are created and "hosted" within a physical system. Examples of virtual entities are: virtual servers, virtual storage, virtual networks including virtual private networks, virtual applications and operating systems, and virtual clients. The physical system can be a stand-alone computer, or alternatively, a computing system utilizing clustered computers and components. Virtual systems are independent operating environments that use virtual resources made up of logical divisions of physical resources such as microprocessors, memory and input/output (I/O) adapters. This system virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how resources are defined and managed, they are the primary technology for system virtualization.

Hypervisors provide the ability to divide physical computing system resources into isolated logical partitions (also referred to as LPARs). Each logical partition operates like an independent computing system running its own operating system (e.g., a virtual system, a virtual machine). Operating systems utilized in this fashion include AIX®, IBM® i, Linux®, and the virtual I/O server (VIOS). Hypervisors allocate dedicated processors (i.e., CPUs), I/O adapters, and memory to each logical partition. Additionally, hypervisors allocate shared or virtualized resources (e.g., processors, memory, storage space, etc.) to each virtual machine (VM). Unbeknownst to the virtual machines, the hypervisor creates a shared processor pool from which the hypervisor allocates virtual resources to the virtual machines as needed. In other words, the hypervisor creates virtual processors, virtual memory, etc. from physical resources so that virtual machines are capable of sharing the physical resources while running independent operating environments.

The hypervisor also dynamically allocates and de-allocates dedicated or shared resources (such as processors, I/O, and memory) across LPARs while the virtual machines are actively in use. This is known as dynamic logical partitioning or dynamic LPAR and allows the hypervisor to dynamically redefine all available system resources to reach optimum capacity for each partition.

Data centers utilizing virtualization of computing resources range from enterprise systems dedicated to a site within a company to distributed computing environments that sell access to their computing resources on an as-needed basis (e.g., cloud computing). Cloud computing is a model of service delivery for enabling convenient, on-demand network access to a shared pool of configurable computing resources that may be rapidly provisioned and released with minimal management effort or interaction with a provider of the service. For example, cloud computing allows a customer to obtain data processing resources, such as networks, network bandwidth, servers, processing, memory, storage, applications, virtual machines, and services as a service on a temporary basis when needed.

A customer of cloud computing services may have its own data processing system resources. At certain times, the customer requires data processing resources beyond those available in its computer network. For example, at certain times, the demand for data processing resources outstrips the capability of the customer's computer network. At these times, the response time of the customer's computer network for some applications increases to unacceptable levels. At other times, the customer requires data processing applications that are not available on the customer's own computer network. For example, the customer requires, at times, the use of data processing applications that are not part of the customer's core competency. At those times when the customer requires data processing resources beyond its own, the customer purchases such resources as a service, on a temporary basis, from a provider of cloud computing services. For example, the customer may obtain additional processing or storage resources or specific application functionality as a service on a temporary basis.

SUMMARY

According to an aspect of the present invention, there is a method, computer program product, and/or system for merging transactions for execution by a database management system. A method for configuring and maintaining external monitoring of one or more instances of a virtual machine within a virtualized computing environment. The method includes a computer processor monitoring a hypervisor. The method further includes a computer processor identifying a first list, wherein the first list is comprised of one or more monitoring templates respectively associated with one or more virtual machine types. The method further includes a computer processor maintaining a second list comprised plurality of provisioned instances of virtual machines, wherein the second list also includes a first information respectively associated with the plurality of provisioned instances of virtual machines. The method further includes a computer processor compiling a third list and in response to compiling the third list, a computer processor communicating with a monitoring system, wherein communicating includes, at least in part, transmitting the third list to the monitoring system. The method further includes a computer processor responding to the monitoring system receiving the third list by executing one or more monitoring functions based, at least in part, on the third list.

DETAILED DESCRIPTION

Figure 1:
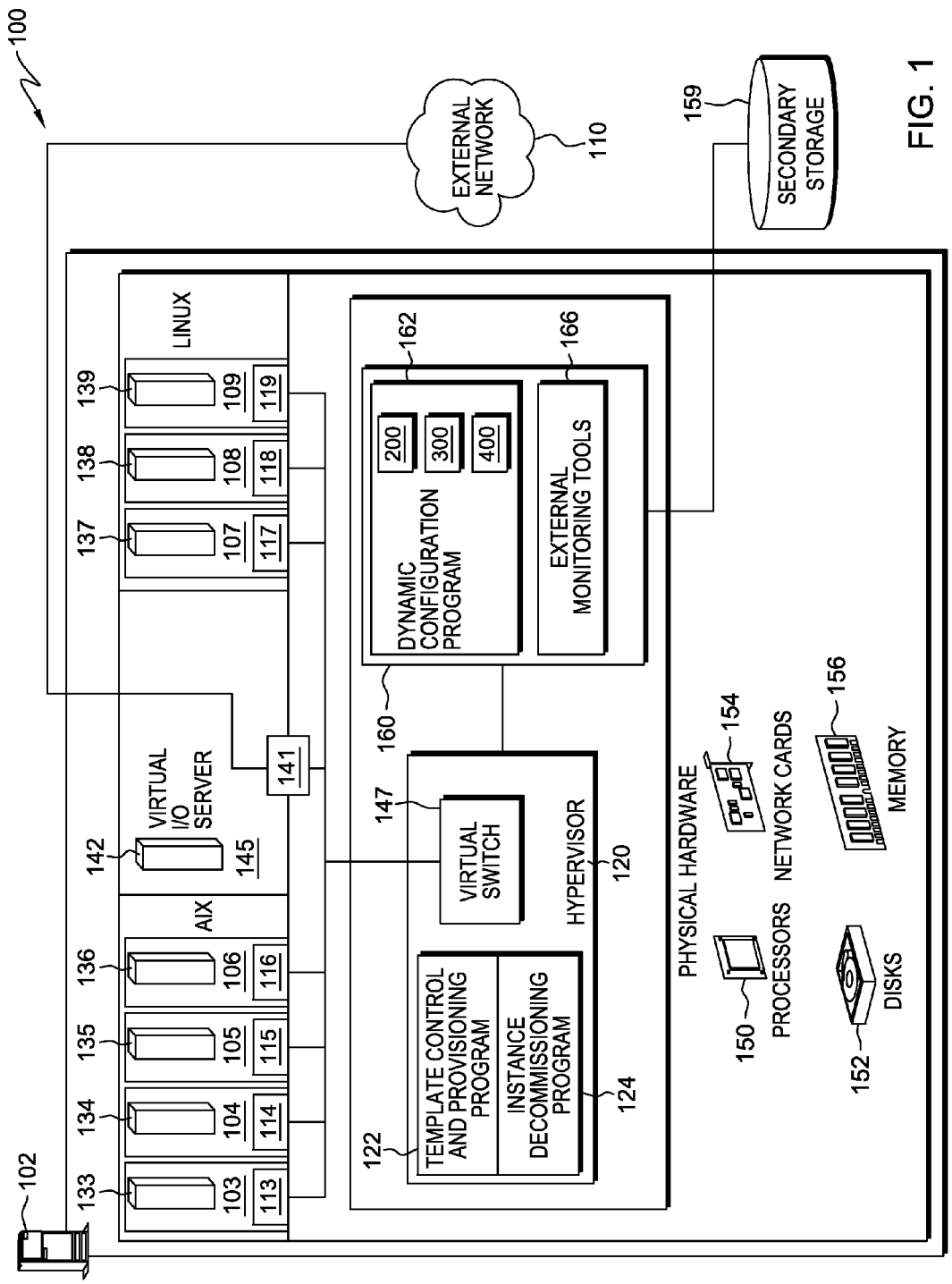
FIG. 1 illustrates a virtualized computer environment, in an embodiment in accordance with the present invention.

Embodiments, in accordance with the present invention, recognize that a computing resource running a hypervisor "provisions" (e.g., creates) a virtual machine (VM) server. Provisioning an instance of a VM server includes allocating computing resources, whether dedicated or shared (e.g., processors, memory, storage space, etc.), loading the appropriate software (operating system, device drivers, middleware, and applications), and changing the VM server's parameters (e.g., IP address, IP Gateway to find associated networks, etc.). The quickest, least disruptive and most automatable method to provision a VM server is by using "templates" accessed by the hosting computing resource. In an embodiment, templates may be standardized non-executable files used by computers and computer software as preformatted examples on which to base other files. Other types of templates may be files that contain predefined information, variables, and/or lists of functions useable by other functions or programs to perform the same series of actions. Embodiments, in accordance with the present invention, address templates as separate entities, associated entities, and/or incorporated entities. For example, a VM template is normally considered a separate entity. Monitoring configuration templates and configuration removal templates are either associated with entities or incorporated within entities. In one embodiment, a configuration removal template is linked or associated with a VM template to allow the resources allocated to an instance of a VM server, created from the VM template, to be released when the instance of the VM server is de-provisioned. In another embodiment, a monitoring configuration template is incorporated within a VM template to allow the instances of a VM server, based on the VM template, to access a specified group of monitoring functions.

Additionally, embodiments, in accordance with the present invention, recognize that within the diverse and complex environment of virtualized computing, monitoring applications are vital to the stability and efficiency of the computing resource. Embodiments, in accordance with the present invention, focus on the dynamic monitoring, configuring, and modification of templates to set up and control the external monitoring of VM server instances. In an embodiment, the monitoring configurations (e.g., the program(s) assigned to monitor the instances of a VM server type) are identified within the template for a VM server type (e.g., incorporated monitoring configuration template). In another embodiment, a monitoring configuration template defines a suite of program(s) (e.g., monitoring configuration) to monitor the instances of a VM server type. The monitoring configuration template is associated with the VM server template and maintains the association with each VM server instance created from the VM server template. Some embodiments allow for dynamic pattern matching between the configuration of the current VM server, which do not include monitoring functions in some cases, and stored templates associated with VM servers containing instances of the monitoring programs or links to the external monitoring tools. Other embodiments, in accordance with the present invention, recognize that variations in the monitoring data may occur based on instances of VM servers being distributed within a non-homogeneous computing environment (e.g., a distributed cluster, a cloud system, etc.) where the performance of physical and virtualized resources differ.

Embodiments, in accordance with the present invention, will now be described in detail with reference to the Figures. FIG. 1 illustrates a virtualized computing environment 100 for adding or updating monitoring tools to templates that are used for provisioning individual virtual machine (VM) environments in an embodiment, in accordance with the present invention. Virtualized computing environment 100 includes computer 102. Computer 102 is divided into multiple logical partitions that include logical partitions 103, 104, 105, 106, 107, 108, 109, and 145. In the illustrated example, logical partitions 103, 104, 105, 106, 107, 108, 109, and 145 each run an independent operating environment, such as an operating system (OS). Logical partitions 103, 104, 105, and 106, respectively, execute OS 133, 134, 135, and 136, which is AIX®. Logical partition 145 runs OS 142, which is a virtual I/O server (VIOS). Logical partitions 107, 108, and 109, respectively, execute OS 137, 138, and 139, which is Linux®. Other operating environments and combinations of operating environments may be included in logical partitions 103, 104, 105, 106, 107, 108, 109, and 145. In various embodiments, any number of partitions may be created and may exist on separate physical computers of a cloud computing system or a clustered computer system.

Communications from external network 110 are routed through Shared Ethernet adapter (SEA) 141 on VIOS partition 145 to virtual adapters 113, 114, 115, 116, 117, 118, and 119 on respective logical partitions 103, 104, 105, 106, 107, 108, and 109. Communications from virtual adapters 113, 114, 115, 116, 117, 118, and 119 on respective logical partitions 103, 104, 105, 106, 107, 108, and 109 may be routed through SEA 141 on VIOS partition 145 to external network 110. In an alternative embodiment, physical network adapters are allocated to logical partitions 103, 104, 105, 106, 107, 108, 109, and 145.

Hypervisor 120 forms logical partitions 103, 104, 105, 106, 107, 108, 109, and 145 from the physical or virtualized resources of computer 102 through logical sharing of designated processors 150, storage disks 152, network cards 154, and/or memory 156 among logical partitions 103, 104, 105, 106, 107, 108, 109, and 145. Hypervisor 120 performs standard operating system functions and manages communication between logical partitions 103, 104, 105, 106, 107, 108, 109, and 145 via virtual switch 147. Virtual switch 147 is a software program that allows one virtual machine to communicate with another. Virtual switch 147 may be embedded into virtualization software or may be included in a server's hardware as part of its firmware. Hypervisor 120 also includes template control and provisioning program 122 and instance decommissioning program 124. Template control and provisioning program 122 is software that controls VM templates (e.g., creates, archives, deletes, modifies, etc.)

and provisions new virtual machines, herein identified as a VM server. Instance decommissioning program 124 releases provisioned resources assigned to a VM server when the VM server is decommissioned (e.g., de-provisioned, deleted, destroyed). In an embodiment, template control and provisioning program 122 provisions new virtual machines within logical partitions 103, 104, 105, 106, 107, 108, 109 based on two operating systems (OS). VM servers 103, 104, 105, and 106 execute the AIX® operating system. VM servers 103, 104, 105, and 106 are based on either the same template or one or more different templates. VM servers 103, 104, and 105 execute the Linux® operating system and are based on either the same template or one or more different templates. In another embodiment, the VM servers provisioned from templates contain other software, applications, and/or middleware as well as the operating system. One of skill in the art will appreciate that in other embodiments template control and provisioning program 122 and/or instance decommissioning program 124 are located on a storage management module connected to hypervisor 120. Alternatively, template control and provisioning program 122 and/or instance decommissioning program 124 execute on a separate computer from computer 102 within virtualized computing environment 100.

System support programs 160 are connected to the hypervisor 120 and include dynamic configuration program 162, external monitoring tools 166, and other ancillary programs (not shown). Dynamic configuration program 162 includes template management program 200, monitoring activity program 300, cleanup program 400, and one or more lists of monitored systems (not shown). In an embodiment, system support programs 160 stores the programs required, list(s) of monitored systems, or data collected on storage disks 152. In another embodiment, system support programs 160 stores the programs required, one or more lists of monitored systems, or data collected on secondary storage 159 within virtualized computing environment 100. In an alternate embodiment, system support programs 160 execute on a separate computer from computer 102 within virtualized computing environment 100.

In an embodiment, template control and provisioning program 122 operates to automatically select and manage OS image templates when provisioning a virtual machine. The virtual machine definition is a template file consisting of a set of attributes that define a virtual machine (VM). The attributes include, for example, any name or identifying description assigned to the virtual machine, an amount of memory requested by the virtual machine, and a number of virtual processor units required by the virtual machine. Additionally, a virtual machine definition can include disks of a virtual machine, network interfaces of a virtual machine, input/output interfaces, any placement constraints and preferences for the virtual machine, as well as any context of the virtual machine including files, disk images, or variables utilized by the virtual machine. A VM template is a master copy (e.g., image) VM that is specifically set aside to produce new VMs. A VM template is a special type of VM that is incapable of being activate. This allows a clean and standard image from which other VMs are created. When a VM template is modified, the modifications do not affect the executing VMs based on the template. A new VM is created by modifying a VM based on an existing VM template; the new VM is subsequently converted into a unique template for future use. Dynamic configuration program 162 interacts with template control and provisioning program 122 to determine which external monitoring tools 166 monitor the provisioned VM server type. For example, the monitoring configuration is associated with a VM server template. In another example, the monitoring configuration is incorporated within the VM server template. In another embodiment, dynamic configuration program 162 updates the template selected by template control and provisioning program 122 with the applicable suite of monitoring programs (e.g., monitoring configuration) from external monitoring tools 166. In a different embodiment, template control and provisioning program 122 is "slaved" to dynamic configuration program 162 and awaits responses from dynamic configuration program 162 before provisioning a VM server.

In an embodiment, template control and provisioning program 122 accesses VM image templates from a template library (not shown) on one or more storage disks 152. In another embodiment, template control and provisioning program 122 accesses the template library located on secondary storage 159 outside of computer 102. In one example, secondary storage 159 is disk storage attached via a dedicated storage area network (SAN) to computer 102 or secondary storage 159 is provided through network file system (NFS) shares or tape provided by a server attached via TCP/IP. In a cloud computing embodiment, template control and provisioning program 122 accesses image templates located on a remote system (not shown) accessed via external network 110. In another cloud computing embodiment, the image templates are transmitted to virtualized computing environment 100 from the remote system (not shown) via external network 110 as part of a system off-load (e.g., remote system is undergoing maintenance activity, experiencing a workload spike, etc.).

Instance decommissioning program 124 operates to release resources associated with a VM server when hypervisor 120 identifies an instance of a VM server to decommission (e.g., de-provision, delete, or destroy). In an embodiment, the provisioned resources are released to computer 102. In another embodiment, the provisioned resources are released to virtualized computing environment 100.

Instance decommissioning program 124 operates to select a configuration removal template (e.g., information) associated with the VM server identified for decommissioning by hypervisor 120. In an embodiment, the configuration removal template is incorporated within the VM server template itself. In another embodiment, the configuration removal template is a separate file in the template library (not shown) on one or more storage disks 152. In another embodiment, instance decommissioning program 124 accesses the template library located on secondary storage 159 outside of computer 102. In one example, secondary storage 159 is disk storage attached via a dedicated storage area network (SAN) to computer 102. In another example, secondary storage 159 is provided through network file system (NFS) shares or tape provided by a server attached via TCP/IP. In a cloud computing embodiment, instance decommissioning program 124 accesses configuration removal templates located on a remote system (not shown) accessed via external network 110. In another cloud computing embodiment, the configuration removal templates are transmitted to virtualized computing environment 100 from the remote system (not shown) via external network 110.

External network 110 can be, for example, a telecommunications network, a wide area network (WAN) such as the Internet, or a combination of the preceding, and can include wired, wireless, or fiber optic connections. In general, external network 110 can be any combination of connections and protocols that will support communications between virtualized computing environment 100 and a plurality of systems and computers (not shown).

External monitoring tools 166 is a collection of programs that monitor various parameters of the virtual machines (e.g., VM state, VM availability, processor loading, memory utilization, bandwidth utilized, system performance, resource overcommitment, etc.) executing on computer 102 within virtualized computing environment 100. As will be appreciated by one skilled in the art, monitoring software ranges from "load balancers" to system monitors. Load balancer software is capable of activating and deactivating physical computing resources as demand changes but also transferring virtualized resources from underutilized VM servers to VM servers whose performance is impacted by insufficient resource allocations. System monitoring software is tailored to watch the physical computing resource for issues signaling an impending hardware failure and move VM servers to stable portions of the computing resource. Other varieties of system monitoring software focus on security (e.g., isolating a VM trying to access data storage resource not allocated to them, locking-out an IP address or host name identified by an outside agency for "spamming" or distributing malware, etc.). Another type of system monitoring software watches the state of VM servers (e.g., paused, stopped, active, reset, resumed, suspended, resized, deleted, etc.) and the creation and modification of templates for VM servers. For example, external monitoring tools 166 can be built-in tools supplied by the vendor of the virtualization software for computer 102 (e.g., accessible by system administrators), integrated tools installed on virtual computing environment 100 (e.g., accessible by users), or third-party tools written by independent software vendors (ISVs). In an embodiment, external monitoring tools 166 create log files listing the monitored parameters and the value of the parameters within time intervals. In another embodiment, external monitoring tools 166 include an application programming interface (API) over which the user may check the performance of one or more virtual machines, a VM server type, an enterprise application (e.g., an electronic storefront comprised of a plurality of VM servers), etc., in real-time (e.g., moving graph, circular gauge, bar chart, etc.).

Figure 2:
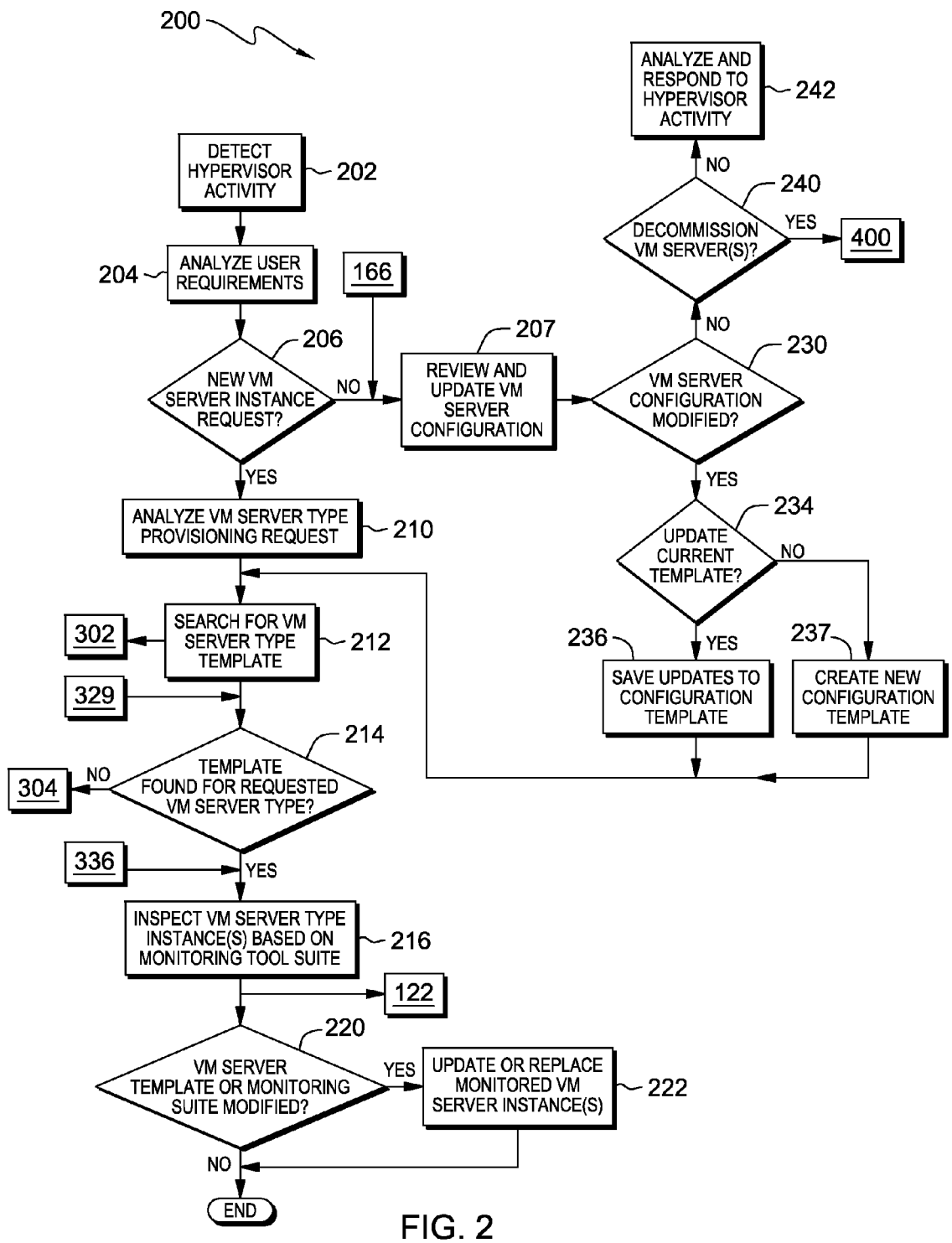
FIG. 2 depicts a flowchart of the steps of a template management program, in accordance with an embodiment of the present invention.

FIG. 2 is a flowchart depicting operational steps of template management program 200, executing within virtualized computing environment 100 of FIG. 1 for monitoring the creation of instances of VM server and dynamically updating the template for the VM server and subsequent instances to include monitoring software in an embodiment, in accordance with the present invention. It should be appreciated by those of skill in the art that the changes to a VM template are highly dependent on the hardware, virtualized environment, operating system (e.g., hypervisor), and administrative controls of the hosting computer system. For example, one hosting computer system provides the user the tools and authority to modify any aspect of a template. Another hosting computer system requires the user to first create and then modify a virtual machine, subsequently converting the virtual machine back to a template. Another hosting computer system provides a hybrid environment for template modification.

In step 202, template management program 200 detects hypervisor activity (e.g., one or more indications). In an embodiment, the detected hypervisor activity is the creation of a VM server (e.g., template control and provisioning program 122 creates a VM server). The VM server is either a new instance, or the VM server is a clone of a currently running VM server. For example, the user creates a new instance of a VM server from a fully defined template, the user customizes a basic template supplied by the hosting computing system, or the user configures a VM server without using a template. In another embodiment, the detected hypervisor activity is associated with a change in status of a currently running VM server or a change in the configuration of the currently running VM server. Changes in status (e.g., state) of a VM server include pausing, stopping, starting, resetting, resuming, suspending, resizing, or decommissioning (e.g., deleting) of one or more instances.

In step 204, template management program 200 analyzes the user requirements associated with the creation or maintenance of one or more VM servers. For example, the user identifies which VM server types are monitored. In another example, the user specifies whether identical VM server instances, or incremental versions (e.g., a template creating a VM server with 50% of the resources) of the original VM server, are provisioned or decommissioned based on performance thresholds. In an embodiment, the user configures a new VM server (e.g., host name, IP address, required computing resources, "mission critical" monitoring, etc.). In another embodiment, the user bases a VM server on a generic, partially configured template (e.g., from a list on cloud or hosting system), adjusts required computing resources, and specifies performance threshold values for which the VM server is monitored.

In decision 206, template management program 200 checks whether the detected hypervisor activity (step 202) is a request for provisioning a new VM server instance. If a new VM server instance is provisioned (yes branch, decision 206), then template management program 200 analyses the provisioning request (step 210).

In step 210, template management program 200 analyzes the VM server type provisioning request. For example, VM server types include AIX®, Linux®, Apache®, database, e-mail, etc. In an embodiment, template management program 200 determines that the provisioned VM server type is based on a template. For example, the resources for provisioning the server are private node, 4 processors, 8 GB of RAM, 40 GB of disk storage (SAN storage), etc., and loaded with a software stack. In another embodiment, template management program 200 determines that the VM server type is not associated with a template.

In step 212, template management program 200 searches for a VM server template that matches the new server instance requirements. In an embodiment, template management program 200 searches for the VM server template on storage disks 152 within computer 102 within virtualized computing environment 100. In another embodiment, template management program 200 searches secondary storage 159 within virtualized computing environment 100.

Step 212 also activates monitoring activity program 300 (step 302, trigger monitoring activities).

If template management program 200 does not locate a direct match for the requested VM server type (no branch, decision 214), then template management program 200 directs dynamic configuration program 162 (depicted in FIG. 1) to decision 304 (analyze provisioning request for VM server type) of monitoring activity program 300

In an embodiment, if template management program 200 locates a template for the requested VM server type (yes branch, decision 214), then template management program 200 inspects the VM server type instance(s) based on the suite of monitoring tools, which are a subset of external monitoring tools 166 (depicted in FIG. 1), determined by monitoring activity program 300.

In step 216, template management program 200 inspects the current instance(s) of the provisioned server type based on the suite of monitoring tools determined by monitoring activity program 300 (step 336). For example, if the VM server was provisioned for four CPUs (central processor units) processing data, then the monitoring tool that tracks CPU performance also track four CPUs. In an embodiment, the VM server type directly matches the suite of monitoring tools associated with the template, and template control and provisioning program 122 starts the provisioned VM server. In another embodiment, the suite of monitoring tools assigned to the VM server type are based on a combination of pattern matching with other VM server templates and user requirements (e.g., operating system, cost sensitive monitoring, etc.).

In an embodiment, template control and provisioning program 122 (depicted in FIG. 1) is slaved to the activities of dynamic configuration program 162 (depicted in FIG. 1). Once the inspection of VM server type instance(s) (e.g., provisioned VM servers) is verified, template control and provisioning program 122 activates the provisioned instance(s) of the VM server type.

If no changes occur to the VM server template, or the suite of monitoring tools assigned to the VM server template subsequent to the VM server instance provisioning and activation (no branch, decision 220), then template management program 200 activity is suspended.

If template management program 200 determines that the template associated with a VM server type was modified or the monitoring suite assigned to a VM server type template was modified (yes branch, decision 220), then the monitored instances associated with the modified VM server type template are updated or replaced (step 222). In an embodiment, external monitoring tools 166 updates the parameters associated with a VM server type. In another embodiment, the user requirements for a given VM server type change, which is reflected in a modification to the VM server type template. In yet another embodiment, template management program 200 identifies that executing instances of one or more VM servers types have been added to the list(s) of monitored systems. An updated template containing a suite of monitoring tools (e.g., monitoring configuration) is applied to the identified executing instances.

In step 222, template management program 200 updates or replaces the monitored VM server instances(s). In an embodiment, the modified parameters of the VM server are updated while the virtual machine is executing. In another embodiment, the monitoring configuration is changed. For example, the new monitoring configuration has a new name. The new name is changed associated with the executing VM servers. In yet another embodiment, the VM server is first paused, the parameter change applied, and the VM server restarted. For example, the monitoring programs defined within the VM server template change, and the monitoring parameters are similarly updated. It should be noted that parameter changes that affect storage (e.g., DASD) increase the possibility of data loss, so backing up data to persistent storage is advisable prior to the storage parameter changes.

In yet another embodiment, if the template changes cannot be applied to a provisioned VM server, then the provisioned VM server requires replacement. In an example embodiment, the steps required to replace a VM server instance are: pause the original VM server instance; provision a new instance based on the updated template; clone the operating system, applications, and data to the new instance; start the new instance and verify that the new instance is properly functioning; and delete the original VM server instance. The aforementioned steps are repeated for each affected instance of the VM server based on the updated template. However, it should be appreciated by those of skill in the art that changes to a VM template that are capable of being directly applied to an executing virtual machine are highly dependent on the hardware, virtualized environment, operating system and applications executing on the virtual machine, and the types of data being handled, etc.

Referring now to decision 206, if the detected hypervisor activity (e.g., an indication) is not a request for a new instance of a VM server (no branch, decision 206), then template management program 200 ascertains to what the hypervisor activity is related.

In step 207, template management program 200 reviews and updates the VM server configuration for one or more instances of a selected VM server type. In an embodiment, the change in configuration changes the provisioning parameters that are capable of being changed on an executing VM server. In another embodiment, the change occurs to the template. In an embodiment, feedback from external monitoring tools 166 (depicted in FIG. 1) applies parameter changes to the one or more instances of a VM server. For example, within the analyzed user requirements (step 204) is a requirement to optimize response time. Parameters capable of modification on an executing VM server are initiated at this step. In another embodiment, changes to a VM server that cannot be directly applied to an executing VM server require a template change and are subsequently instituted at step 222 of template management program 200. For example, external monitoring tools 166 are not optimized for a cost sensitive computing application for the user. The suite of monitoring tools specified within the template is changed to track the VM server based on the requirement of cost.

If the hypervisor activity associated with a currently executing instance of a VM server does not require a configuration change (no branch, decision 230), then the hypervisor activity is checked to determine if the executing instance(s) of a VM server are decommissioning.

Figure 4:
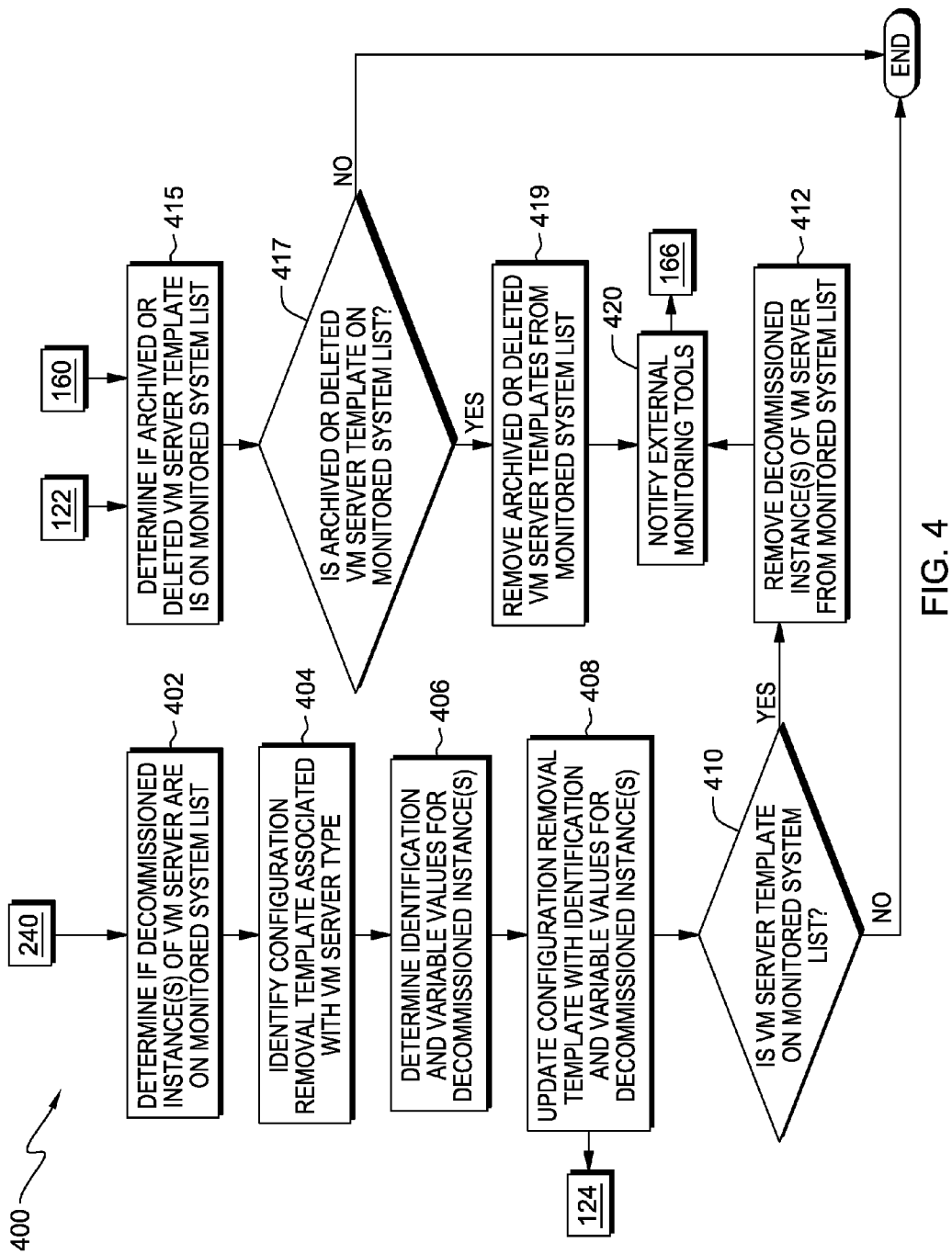
FIG. 4 depicts a flowchart of the steps of a cleanup program, in accordance with an embodiment of the present invention.

If the hypervisor activity associated with currently executing instance(s) of a VM are decommissioned (yes branch, step 240), then template management program 200 transfers control to cleanup program 400 (depicted in FIG. 4).

If the detected hypervisor activity is not associated with decommissioning of currently executing instance(s) of a VM (no branch, decision 240), then the hypervisor activity is analyzed separately (no branch, decision 240).

In step 242, template management program 200 analyzes hypervisor activity and responds accordingly. In an embodiment, the detected hypervisor activity is a change in status of one or more instances of a VM server. For example, if a user's demand for computing resources is highly variable, then it is advantageous to pause instances of a VM server when demand drops and incrementally restart instances of the VM server rather than decommissioning the instances. Dynamic configuration program 162 (depicted in FIG. 1) updates the one or more lists of monitored systems to identify the paused instances since a common suite of tools is used for a template. As instances are restarted, the one or more lists of monitored systems are subsequently updated. In another embodiment, template management program 200 determines that the hypervisor activity is unrelated to any VM servers on the one or more lists of monitored systems, and template management program 200 does not respond and/or analyze this activity.

Referring now to decision 230, if the VM server configuration was modified (yes branch, decision 230), then template management program 200 decides whether to save the configuration change to the current template (yes branch, decision 234) or to create a new template (no branch, decision 234). In an embodiment, the user requirements determine whether to save the configuration changes to the current template. In one instance, the user's requirements define whether the decision is automated. In another instance, the determination to save the configuration changes requires user intervention. For example, if the user is testing various configurations, then the user indicates to template management program 200 to pause at decision 234 until the user has reviewed the performance data collected by external monitoring tools 166 (depicted in FIG. 1). In another embodiment, template management program 200 determines, via dynamic pattern matching of the modified configuration to templates within the template library, whether any templates match the modified configuration and decides to save the current modifications, as well as apply the modifications to other templates within the template library.

In step 236 (yes branch, decision 234), template management program 200 saves the updates to the VM server configuration to the current template. In an embodiment, template management program 200 propagates the changes to the provisioned instances of the VM server. In another embodiment, template management program 200 only applies the updated template to new instances of the VM server type. In a different embodiment, template management program 200 archives the current template before saving the updated configuration to the current template's file name. For example, the user needs to study the data from external monitoring tools 166 (depicted in FIG. 1) over an extended period. If the update template does not show a cost vs. performance benefit, then the user decides to delete the current template and unarchive the original version of the template. When the user deletes the template, dynamic configuration program 162 deletes the reference to the template from the one or more lists of monitored systems.

Template management program 200 forwards the configuration changes to templates from step 236 and step 237 to step 212 to trigger monitoring activity program 300 (See FIG. 3) to review the template changes. Monitoring activity program 300 determines whether the new template is added to the one or more lists of monitored systems. In an embodiment, monitoring activity program 300 determines a different suite of monitoring tools from external monitoring tools 166 (depicted in FIG. 1) is applied to the new template.

In step 237 (no branch, decision 234), template management program 200 saves the updates to the VM server configuration to a new template. In an embodiment, template management program 200 applies the new template to new instances of the VM server type.

Figure 3:
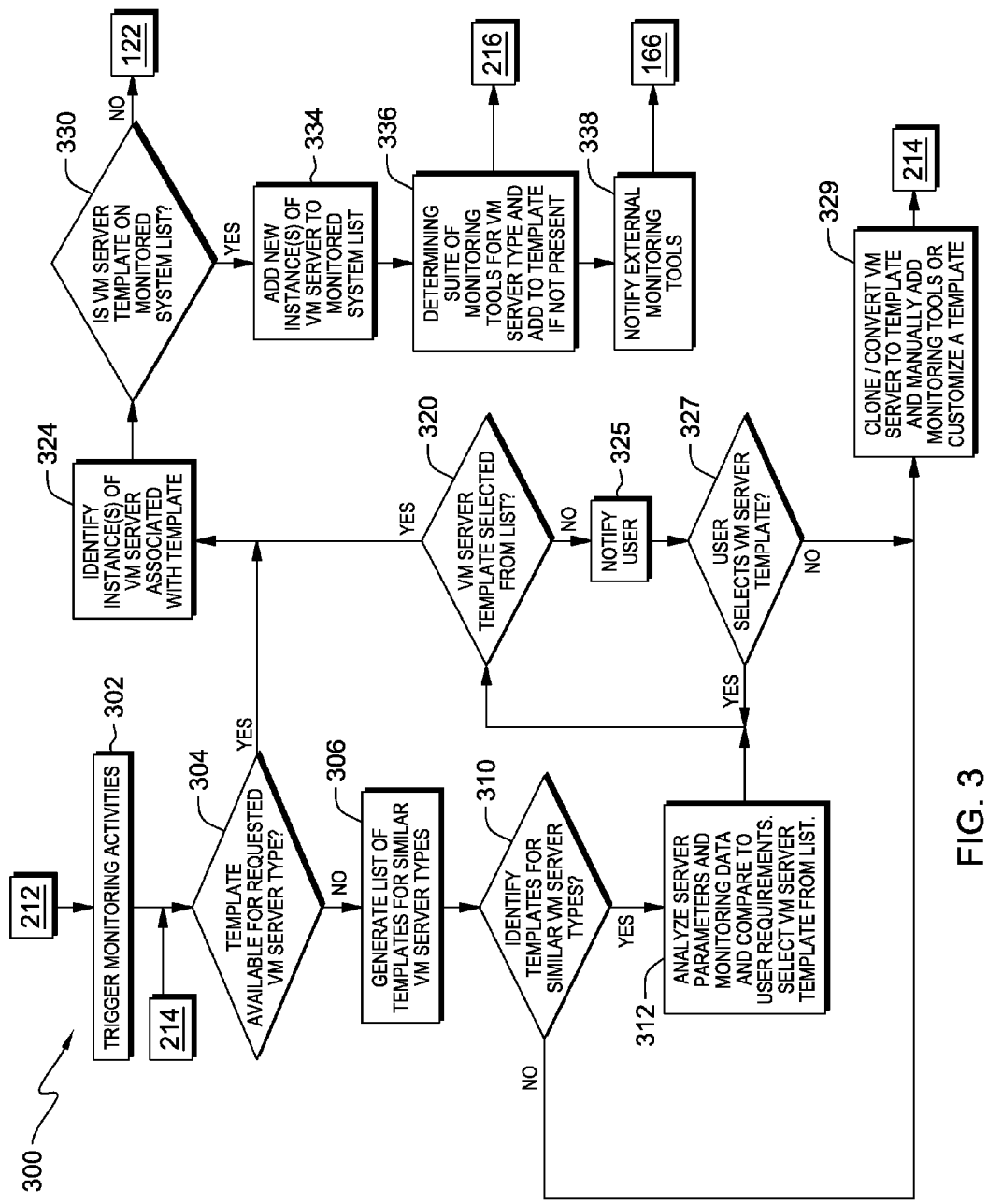
FIG. 3 depicts a flowchart of the steps of a monitoring activity program, in accordance with an embodiment of the present invention.

FIG. 3 is a flowchart depicting operational steps of monitoring activity program 300, executing within virtualized computing environment 100 of FIG. 1. Monitoring activity program 300 determines suites of monitoring tools from the collection of external monitoring tools 166 (depicted in FIG. 1), applying the suites of monitoring tools to the appropriate templates, and identifying which VM server types and instances of VM servers that are on the list(s) of monitored systems.

In an embodiment, monitoring activity program 300 locates templates similar to the VM server provisioned by the user and, using dynamic pattern matching, identifies which predefined template matches the user's requirements. Monitoring activity program 300 replaces (e.g. populates) variable values in the identified template with the variable values gathered from the hypervisor monitoring (e.g., provisioning requirements). In another embodiment, monitoring activity program 300 updates one or more monitored systems lists. For example, the one or more monitored systems lists include: a VM server type, a user ID, a template name, a suite of monitoring tools assigned to a template, instances of a VM server, a status for each VM server instance, etc. Monitoring activity program 300 groups VM server type instances and the associated suite of monitoring tools to reduce the overhead of the external monitoring tools.

In step 302, monitoring activity program 300 is triggered by template management program 200 searching for a VM server type template (step 212). In an embodiment, the triggered monitoring activities include accessing the one or more lists of monitored systems, external monitoring tools 166 (depicted in FIG. 1), and template control and provisioning program 122 (depicted in FIG. 1). In another embodiment, the triggering of monitoring activity is bypassed if the template is not found for the provisioned instance of a VM server (no branch, decision 214).

If a template for the provisioned VM server type was not found (no branch, decision 304), then monitoring activity program 300 combines the analysis of the provisioning requested for the VM server type and the user's requirements to perform dynamic pattern matching (not shown) on the template library. In an embodiment, the dynamic pattern matching searches for similar templates based on one or more of the following: operating system, host name, IP address, software stack, etc.

In step 306, monitoring activity program 300 generates a list of templates that are similar to the provisioned VM server type. In an embodiment, monitoring activity program 300 compares software stacks associated with VM server templates in the template library to the VM server being provisioned. In another embodiment, monitoring activity program 300 searches the template library for VM server templates based on the provisioned resources.

In an embodiment based on a currently executing VM server as opposed to a new VM server instance request, monitoring activity program 300 responds to the feedback from the external monitoring tools 166 (depicted in FIG. 1) and/or the user from template management program 200 (at step 207 in FIG. 2). For example, monitoring activity program 300 searches for a VM server template that meets the user's performance needs at a lower unit cost.

If a similar VM server type template is not found (no branch, decision 310), then monitoring activity program 300 notifies the user to configure a template for the current VM server provisioning request. For example, monitoring activity program 300 communicates with the user via external network 110 using the user interface associated with creating the provisioning request for the cloud computing service provider.

In step 329, monitoring activity program 300 provides the user the capability to convert/clone the currently provisioned VM server to a template file, manually add monitoring tools to the template, customize a VM server from a list generated by monitoring activity program 300 (step 306), etc. Subsequently, monitoring activity program 300 transfers control to template management program 200 (prior to decision step 214). In an embodiment, the user creates a VM server template from the current provisioning request, via template control and provisioning program 122 (depicted in FIG. 1), to clone the VM server or convert the VM server. The user also identifies that VM server instances based on the template are added to the one or more lists of monitored systems and manually adds the monitoring tools from external monitoring tools 166 (depicted in FIG. 1) that will be associated with the template. In another embodiment, the user customizes a VM server template from the list of similar VM server types generated by monitoring activity program 300 (step 306). Monitoring activity program 300 removes instance-specific information from the templates in the list of similar templates presented to the user and replaces the instance-specific information with "tokens." For example, the token locations represent template parameters, monitoring thresholds, or user specific information (e.g., ports, hostnames, IP addresses, etc.), etc. Some or all of the tokens are customized to create a functional, new VM server template. In another embodiment, template and VM server creation, modification, cloning, converting, deleting, archiving, and unarchiving are facilitated by a system support program 160 (not shown) or an API (not shown) within virtualized computing environment 100.

If monitoring activity program 300 finds similar templates for the provisioned VM server (yes branch, decision 310), then monitoring activity program 300 selects a template from the list of templates for similar VM server types.

In step 312, monitoring activity program 300 analyzes the parameters of the identified VM server templates and the monitoring data associated with the identified templates. Monitoring activity program 300 compares the analysis of the identified VM server templates to the user's requirements. In an embodiment, monitoring activity program 300 selects a VM server template to apply to the current provisioning request. In another embodiment, monitoring activity program 300 creates a ranked list of VM server templates, saves the list, and associates it with a user, a hostname, an IP address, etc. For example, if on subsequent analysis of the monitoring data, the automatically selected template does not meet the user's requirements, then the user retrieves the saved list of templates and reviews the available provisioning and performance information. Based on the list of templates provided, the user selects one of the templates to provision another VM server and repeats the process. In yet another embodiment, either monitoring activity program 300 was unable to reconcile the user's requirements and the listed templates, or the user's requirements defined that the user controlled the VM server template selection.

If no VM server template was selected (no branch, decision 320), then monitoring activity program 300 notifies the user (step 325).

In step 325, monitoring activity program 300 notifies the user that a decision is required in the selection of a VM server template. In an example embodiment, monitoring activity program 300 communicates with the user via external network 110 using the user interface associated with creating the provisioning request for the cloud computing service provider. In another example embodiment, the user is not logged into the computer system hosting the user's VM servers at the time of provisioning the VM server. Monitoring activity program 300 reviews: the user's requirements, system communication with the user, user's account information, etc., to determine one or more methods to notify the user (e.g., e-mail, text message, instant message, automated phone call, etc.).

Monitoring activity program 300 provides the user with the list of VM server templates similar to the user's provisioning request (step 306). In an embodiment, the user reviews the attributes of the listed VM server templates and any associated monitoring information (e.g., suite of monitoring tools, performance data, cost data, etc.). If the user selects a VM server template as the basis of a new VM server template, for the currently provisioned request, (yes branch, decision 327), then monitoring activity program 300 modifies the selected VM server template to contain the user's information (e.g., user ID, account number, number of instances to create, etc.), any unique variables from the provisioning request (e.g., software stack, IP address, associated databases, URL links, etc.), and saves the modified template (e.g., a new name, a file associated with the provisioning request, etc.). In another embodiment, the user indicates to monitoring activity program 300 that a VM server template on the generated list requires authorization prior to use.

If the user does not select a template from the list of similar VM servers or a listed template needs modification, monitoring activity program 300 (no branch, decision 327), then the user manually intervenes to create a template or customize a template (step 329).

Referring now to decisions 304 and 320, if a template is available for the requested VM server type (yes branch, decision 304), monitoring activity program 300 automatically selects a VM server template, or the user selects a VM server template from the list of similar VM server types generated in step 306 (yes branch, decision 320), then monitoring activity program 300 identifies the instance(s) of the VM server that are associated with selected template (step 324).

In step 324, monitoring activity program 300 identifies the one or more instances of VM servers that are associated with the available or selected VM server type template. In an embodiment, the identified VM server instances are executing on computer 102. In another embodiment, the identified VM server instances are distributed throughout virtualized computing environment 100. In yet another embodiment, the identified instances are distributed within a non-homogeneous computing environment (e.g., a distributed cluster, a cloud system, etc.) where the performance of physical and virtualized resources differ. This affects the accuracy of the data gathered by external monitoring tools 166 (depicted in FIG. 1).

If the VM server template used for provisioning the current instance(s) of a VM server are not on the one or more lists of monitored systems (no branch, decision 330), then template control and provisioning program 122 (depicted in FIG. 1) proceeds with provisioning the instance(s) of the VM server.

If the VM server template used for provisioning the current instance(s) of a VM server are on the one or more lists of monitored systems (yes branch, decision 330), then the new instance(s) are added to the one or more lists of monitored systems (step 334).

In step 334, monitoring activity program 300 adds the new instance(s) of the VM server to a monitored systems list. In an embodiment, one monitored systems list is assigned to computer 102 that contains the information about the monitored instances of VM servers under the control of hypervisor 120. In another embodiment, the one or more lists of monitored systems track the instances of the monitored VM server across multiple hypervisors within virtualized computing environment 100.

In step 336, monitoring activity program 300 determines a suite of monitoring tools, from the group of external monitoring tools 166 (depicted in FIG. 1), which will be applied to the VM server type. Monitoring activity program 300 advises template management program 200 which monitoring tools are defined for a VM server template so that instances of the VM server are inspected (step 216). In an embodiment, the template for the VM server type already contains a suite of monitoring tools. Monitoring activity program 300 reviews the user requirements and determines whether the suite of monitoring tools defined in the VM server template meets the user's requirements. Based on other parameters defined by the user in the user requirements, user profile, or other documentation, monitoring activity program 300: updates the template the determined suit of monitoring tools, leaves the current suite of monitoring tools as defined in the template, or contacts the user to make the decision. In another embodiment, the template for the VM server type does not have a suite of monitoring tools defined. Monitoring activity program 300 adds the determined suite of monitoring tools to the VM server type template.

In step 338, monitoring activity program 300 notifies external monitoring tools 166 (depicted in FIG. 1) that a VM server type template will be monitored, the suite of tools used to monitor the template, and the instances of the VM server that have been provisioned. In an embodiment, external monitoring tools 166 create log files listing the monitored parameters and the value of the parameters within time intervals. In another embodiment, external monitoring tools 166 has an application programming interface (API) enabling the user to check the performance of one or more virtual machines, a VM server type, an enterprise application (e.g., an electronic storefront comprised of a plurality of VM servers), etc. in real-time (e.g., moving graph, circular gauge, bar chart, etc.).

FIG. 4 is a flowchart depicting operational steps of cleanup program 400, executing within virtualized computing environment 100 of FIG. 1. Cleanup program 400 determines which decommissioned VM server instance(s) are on the one or more lists of monitored systems, ensures that the associated resources are released, removes decommissioned instance(s) from the one or more lists of monitored systems, and notifies the external monitoring tools 166 (depicted in FIG. 1) of which VM server instance(s) to cease monitoring. Cleanup program 400 performs similar functions when a VM server template is archived or deleted.

In step 402, cleanup program 400 receives information from template management program 200 (step 240) that activity detected on hypervisor 120 is related to a request to decommission one or more VM server instances. Cleanup program 400 determines which of the one or more VM server instances decommissioned (e.g., VM state is changed to deleted) is on the one or more lists of monitored systems.

In step 404, cleanup program 400 identifies the configuration removal template associated with the VM server decommissioning request to release (e.g., de-provision) the resources allocated to the instance of the VM server. In an embodiment, the configuration removal information is incorporated within the VM server template. Cleanup program 400 obtains the configuration removal information from the VM server template to create a configuration removal template for the decommissioning request. In another embodiment, the configuration removal template is a separate file that is associated with one or more VM server templates.

In step 406, cleanup program 400 determines the identification information and variable values for the decommissioned instance of a VM server. In an embodiment, cleanup program 400 identifies the information for the named variables (e.g., IP address, hostname, etc.) specific to the decommissioned instance(s) of the VM server. In another embodiment, cleanup program 400 identifies which suite of external monitoring tools 166 (depicted in FIG. 1) are monitoring the decommissioned instance(s) of the VM server to facilitate the subsequent analysis, saving, and/or deletion of the monitoring data.

In step 408, cleanup program 400 updates the configuration removal template with the identification information and named variable values for the VM server decommission request. In an embodiment, cleanup program 400 passes the updated configuration removal template to instance decommissioning program 124 (depicted in FIG. 1) for the VM server decommissioning request.

If cleanup program 400 determines that the decommissioned instance of a VM server is not on one or more lists of monitored systems (no branch, decision 410), then cleanup program 400 ends.

In step 412, if cleanup program 400 determined that the decommissioned instance of a VM server is on one or more lists of monitored systems (yes branch, decision 410), then the instance(s) of the decommissioned VM server are removed from the one or more lists of monitored systems. In an embodiment, the decommissioned instance(s) are removed from the active monitored systems list(s) and are saved in a log file for future reference. In another embodiment, the one or more lists of monitored systems have a section identifying the VM server instance by the status associated with the instance (e.g., executing, paused, stopped, backing-up, decommissioned, etc.).

In step 420, cleanup program 400 notifies the suite of external monitoring tools 166 (depicted in FIG. 1) associated with the instance of the VM server that the instance is decommissioned. In an embodiment, the external monitoring tools 166 end the data collection for the decommissioned instance(s) of the VM server. In another embodiment, external monitoring tools 166 determine that user requirements were assigned to the VM server type. For example, external monitoring tools 166 transmit a log file to the user, via external network 110, describing the monitored behavior of the identified VM server type (e.g., latency change with load, resource usage, etc.). In another embodiment, cleanup program 400 handles the effects of archiving or deleting VM server templates. For example, external monitoring tools 166 store performance data associated with the archived VM server type on secondary storage 159. In another example, external monitoring tools 166 transmit the archived template and the performance data associated with the archived VM server type to a cloud computing environment (not shown) via external network 110 providing the user a method to compare behavior of virtualized computing environment 100 to the cloud computing environment.

In step 415, cleanup program 400 receives a request to archive or delete a VM server template from template control and provisioning program 122 (depicted in FIG. 1) or system support programs 160 (depicted in FIG. 1). Cleanup program 400 determines whether the archived or deleted VM server template is on one or more lists of monitored systems.

If cleanup program 400 determines that the archived or deleted VM server template is not on one or more lists of monitored systems (no branch, decision 417), then cleanup program 400 ends.

If cleanup program 400 determines that the archived or deleted VM server template is on one or more monitored systems list(s) (yes branch, decision 417), then cleanup program 400 removes the archived or deleted VM server template from one or more lists of monitored systems (step 419). In an embodiment, the archived or deleted VM server template is removed from the active one or more lists of monitored systems and saved in a log file for future reference. In another embodiment, the one or more lists of monitored systems have a section identifying the VM server template by the status associated with the VM server (e.g., active, archived, deleted, etc.).

As will be appreciated by one skilled in the art, aspects of the present invention may be embodied as a system, method or computer program product. Accordingly, aspects of the present invention may take the form of an entirely hardware embodiment, an entirely software embodiment (e.g., including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

It is understood in advance that although this disclosure includes references to cloud computing, implementations of the teachings recited herein are not limited to the cloud computing environment. Rather, the illustrative embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that are rapidly provisioned and released with minimal management effort or interaction with a provider of the service.

Figure 5:
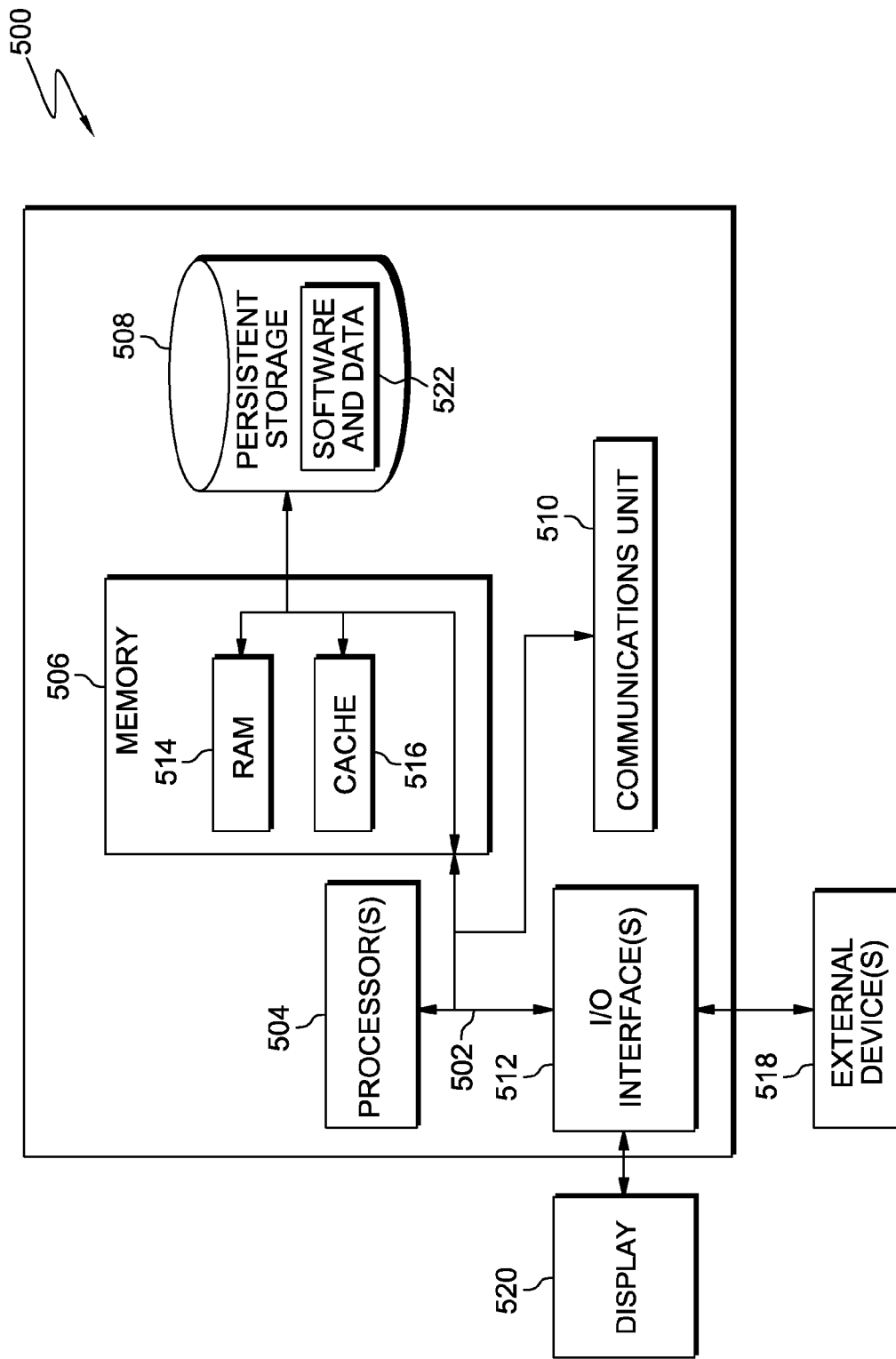
FIG. 5 is a block diagram of components of a computer, in accordance with an embodiment of the present invention.

FIG. 5 depicts a block diagram of components of computer 102 in an illustrative embodiment, in accordance with the present invention. It should be appreciated that FIG. 5 provides only an illustration of one implementation and does not imply any limitations with regard to the environments in which different embodiments may be implemented. Many modifications to the depicted environment may be made.

Computer 102 includes communications fabric 502, which provides communications between computer processor(s) 504, memory 506, persistent storage 508, communications unit 510, and input/output (I/O) interface(s) 512. Processor(s) 504 includes, at least in part, designated processors 150 depicted in FIG. 1 to be shared among logical partitions. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In an embodiment, memory 506 includes random access memory (RAM) 514 and cache memory 516. In general, memory 506 can include any suitable volatile or non-volatile computer readable storage media. Software and data 522 are stored in persistent storage 508 for access and/or execution by processor(s) 504 via one or more memories of memory 506. With respect to computer 102, software and data 522 includes template control and provisioning program 122, instance decommissioning program 124, and system support programs 160 that include dynamic configuration program 162 and external monitoring tools 166. Dynamic configuration program 162 includes template management program 200, monitoring activity program 300, and cleanup program 400. Memory 506 includes, at least in part, designated memory 156 depicted in FIG. 1 to be shared among logical partitions.

Software and data 522 are stored in persistent storage 508 for execution by one or more of the respective processor(s) 504 via one or more memories of memory 506. Persistent storage 508 includes, at least in part, designated storage disks 152 depicted in FIG. 1 to be shared by logical partitions. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of computer 102 and external network 110. In these examples, communications unit 510 includes one or more network interface cards. Communications unit 510 may provide communications through the use of either or both physical and wireless communications links. Software and data 522 may be downloaded to persistent storage 508 through communications unit 510. Communications unit 510 includes, at least in part, designated network cards 154 depicted in FIG. 1 to be shared by the logical partitions, preferably through VIOS partition 145.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 may also include portable computer readable storage media such as, for example, thumb drives, portable optical or magnetic disks, and memory cards. Software and data 522 may be stored on such portable computer readable storage media and loaded onto persistent storage 508 via I/O interface(s) 512. I/O interface(s) 512 also connect to a display 520. In an embodiment, I/O interfaces are also shared among logical partition via VIOS partition 145.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for configuring and maintaining external monitoring of one or more instances of a virtual machine within a virtualized computing environment, the computer program product comprising:

one or more computer readable storage media and program instructions stored on the one or more computer readable storage media, the program instructions comprising:
  program instructions to monitor a hypervisor;
  program instructions to identify a first list, wherein the first list is comprised of one or more monitoring templates respectively associated with one or more virtual machine types;
  program instructions to maintain a second list comprised of a plurality of provisioned instances of virtual machines executing on the hypervisor, wherein the second list also includes a first set of information respectively associated with the plurality of provisioned instances of virtual machines, and wherein the first set of information respectively includes at least one of an ID, a state of a virtual machine, a virtual machine template, and a virtual machine type identified within the first list;
  program instructions to compile a third list comprised of monitored instances of provisioned virtual machines executing on the hypervisor, based, at least in part, on the first list and the second list, and wherein the list of monitored instances is respectively associated with one or more monitoring templates;
  in response to compiling the third list, program instructions to communicate with a monitoring system, wherein communicating includes, at least in part, program instructions to transmit the third list to the monitoring system; and
  in response to the monitoring system receiving the third list, program instructions to execute one or more functions to monitor the hypervisor based, at least in part, on the third list.

2. The computer program product of claim 1, further comprising:
  program instructions to detect provisioning of a first instance of a first virtual machine;
  program instructions to identify a second set of information associated with the first instance of the first virtual machine;
  program instructions to determine whether a first virtual machine type is associated with the second set of information of the first instance of the first virtual machine and whether the first virtual machine type is included within the first list; and
  in response to determining that the first virtual machine type associated with the first instance of the first virtual machine is included within the first list, program instructions to update the third list based, at least in part, on second set of information of the first instance of the first virtual machine and first monitoring template that is associated with the respective first virtual machine type.

3. The computer program product of claim 2, further comprising:
  program instructions to obtain, from the hypervisor, a fourth set of information associated with a new instance of a second virtual machine server;
  program instructions to determine that a second virtual machine type within the first list is associated with the new instance of the second virtual machine server and that the second virtual machine type is included within the first list;
  in response to determining that the second virtual machine type is associated with new instance of the second virtual machine server, program instructions to identify a predefined monitoring template associated with the second virtual machine type;
  program instructions to populate the predefined monitoring template, at least in part, with the fourth set of information obtained from the hypervisor; and
  program instructions to associate the populated monitoring template with the new instance of the second virtual machine server and update the third list to include the new instance of the second virtual machine server.

4. The computer program product of claim 2, further comprising:
  program instructions to obtain one or more user requirements related to creating an instance of third virtual machine server;
  program instructions to obtain, from the hypervisor, a set of virtual machine parameters associated with the created instance of the third virtual machine server and a third set of information associated with the created instance of the third virtual machine server;
  program instructions to determine that the third virtual machine server is not associated with a virtual machine type within the first list;
  in response to a determining that the third virtual machine server is not associated with a virtual machine type within the first list, program instructions to determine a degree of similarity between third set of virtual machine parameters and respective sets of virtual machine parameters associated with the virtual machine types of the first list;
  program instructions to select a virtual machine type from the first list based on at least one of: at least one user requirement, the degree of similarity, at least one computing resource, and at least one software, wherein the virtual machine type is based on a virtual machine template or a virtual machine image; and
  program instructions to respond to a selection of the virtual machine type by associating the third virtual machine server with the selected virtual machine type, and wherein associating also includes program instructions to apply a monitoring template dictated by the selected second virtual machine type; and
  program instructions to add the third virtual machine type to the first list.

5. The computer program product of claim 1, further comprising:
  program instructions to obtain a first indication, from the hypervisor, that a change to the second set of information is associated with a second instance of a first virtual machine occurred;
  program instructions to determine whether the change to the second set of information comprised a change in state and whether the change in state is deleted;
  program instructions to determine whether an ID associated with the second instance of the first virtual machine is identified within the third list; and
  in response to determining that the change in state of the second instance of the first virtual machine is deleted and that the ID associated with the second instance of the first virtual machine is identified within the third list, program instructions to respectively remove the second instance of the first virtual machine from the second list and the third list.

6. The computer program product of claim 5, further comprising:
- program instructions to obtain a second indication, from the hypervisor, that another change to a third set of information associated with a third instance of the first virtual machine occurred;
- program instructions to determine whether the other change to the third set of information comprised another change in state and whether the other change in state is not deleted;
- program instructions to determine whether the ID associated with the third instance of the first virtual machine is identified within the third list;
- in response to determining that the other change in state of the third instance of the first virtual machine is not deleted, and that the ID associated with the third instance is identified within the third list, program instructions to respectively update the other state associated with the third instance in the third list, based at least in part, on the other change to the third set of information associated with a third instance of the first virtual machine; and
- program instruction to modify the execution of the one or more monitoring functions associated with the third instance of the first virtual machine based, at least in part, on the other change in state associated with the third instance of the first virtual machine.

7. A computer system for configuring and maintaining external monitoring of one or more instances of a virtual machine within a virtualized computing environment, the computer system comprising:
- one or more computer processors;
- one or more computer readable storage media;
- program instructions stored on the computer readable storage media for execution by at least one of the one or more computer processors, the program instructions comprising:
  - program instructions to monitor a hypervisor;
  - program instructions to identify a first list, wherein the first list is comprised of one or more monitoring templates respectively associated with one or more virtual machine types;
  - program instructions to maintain a second list comprised of a plurality of provisioned instances of virtual machines executing on the hypervisor, wherein the second list also includes a first set of information respectively associated with the plurality of provisioned instances of virtual machines, and wherein the first set of information respectively includes at least one of an ID, a state of a virtual machine, a virtual machine template, and a virtual machine type identified within the first list;
  - program instructions to compile a third list comprised of monitored instances of provisioned virtual machines executing on the hypervisor, based, at least in part, on the first list and the second list, and wherein the list of monitored instances is respectively associated with one or more monitoring templates;
  - in response to compiling the third list, program instructions to communicate with a monitoring system, wherein communicating includes, at least in part, program instructions to transmit the third list to the monitoring system; and
  - in response to the monitoring system receiving the third list, program instructions to execute one or more functions to monitor the hypervisor based, at least in part, on the third list.

8. The computer system of claim 7, further comprising:
- program instructions to detect provisioning of a first instance of a first virtual machine;
- program instructions to identify a second set of information associated with the first instance of the first virtual machine;
- program instructions to determine whether a first virtual machine type is associated with the second set of information of the first instance of the first virtual machine and whether the first virtual machine type is included within the first list; and
- in response to determining that the first virtual machine type associated with the first instance of the first virtual machine is included within the first list, program instructions to update the third list based, at least in part, on second set of information of the first instance of the first virtual machine and first monitoring template that is associated with the respective first virtual machine type.

9. The computer system of claim 8, further comprising:
- program instructions to obtain, from the hypervisor, a fourth set of information associated with a new instance of a second virtual machine server;
- program instructions to determine that a second virtual machine type within the first list is associated with the new instance of the second virtual machine server and that the second virtual machine type is included within the first list;
- in response to determining that the second virtual machine type is associated with new instance of the second virtual machine server, program instructions to identify a predefined monitoring template associated with the second virtual machine type;
- program instructions to populate the predefined monitoring template, at least in part, with the fourth set of information obtained from the hypervisor; and
- program instructions to associate the populated monitoring template with the new instance of the second virtual machine server and update the third list to include the new instance of the second virtual machine server.

10. The computer system of claim 8, further comprising:
- program instructions to obtain one or more user requirements related to creating an instance of third virtual machine server;
- program instructions to obtain, from the hypervisor, a set of virtual machine parameters associated with the created instance of the third virtual machine server and a third set of information associated with the created instance of the third virtual machine server;
- program instructions to determine that the third virtual machine server is not associated with a virtual machine type within the first list;
- in response to a determining that the third virtual machine server is not associated with a virtual machine type within the first list, program instructions to determine a degree of similarity between third set of virtual machine parameters and respective sets of virtual machine parameters associated with the virtual machine types of the first list;
- program instructions to select a virtual machine type from the first list based on at least one of: at least one user requirement, the degree of similarity, at least one computing resource, and at least one software, wherein the virtual machine type is based on a virtual machine template or a virtual machine image;

program instructions to respond to a selection of the virtual machine type by associating the third virtual machine server with the selected virtual machine type, and wherein associating also includes program instructions to apply a monitoring template dictated by the selected second virtual machine type; and program instructions to add the third virtual machine type to the first list.

11. The computer system of claim 7, further comprising:

program instructions to obtain a first indication, from the hypervisor, that a change to the second set of information is associated with a second instance of a first virtual machine occurred;

program instructions to determine whether the change to the second set of information comprised a change in state and whether the change in state is deleted;

program instructions to determine whether an ID associated with the second instance of the first virtual machine is identified within the third list; and in response to determining that the change in state of the second instance of the first virtual machine is deleted and that the ID associated with the second instance of the first virtual machine is identified within the third list, program instructions to respectively remove the second instance of the first virtual machine from the second list and the third list.

12. The computer system of claim 11, further comprising:

program instructions to obtain a second indication, from the hypervisor, that another change to a third set of information associated with a third instance of the first virtual machine occurred;

program instructions to determine whether the other change to the third set of information comprised another change in state and whether the other change in state is not deleted;

program instructions to determine whether the ID associated with the third instance of the first virtual machine is identified within the third list;

in response to determining that the other change in state of the third instance of the first virtual machine is not deleted, and that the ID associated with the third instance is identified within the third list, program instructions to respectively update the other state associated with the third instance in the third list, based at least in part, on the other change to the third set of information associated with a third instance of the first virtual machine; and program instruction to modify the execution of the one or more monitoring functions associated with the third instance of the first virtual machine based, at least in part, on the other change in state associated with the third instance of the first virtual machine.

* * * * *